US006985761B2

(12) United States Patent
Mele

(10) Patent No.: US 6,985,761 B2
(45) Date of Patent: Jan. 10, 2006

(54) SUPERCONDUCTING CABLE

(75) Inventor: Renata Mele, Milan (IT)

(73) Assignee: Pirelli S.p.A., Milan (IT)

(*) Notice: Subject to any disclaimer, the term of this patent is extended or adjusted under 35 U.S.C. 154(b) by 90 days.

(21) Appl. No.: 10/344,455

(22) PCT Filed: Aug. 2, 2001

(86) PCT No.: PCT/EP01/08950

§ 371 (c)(1),
(2), (4) Date: Jun. 16, 2003

(87) PCT Pub. No.: WO02/15203

PCT Pub. Date: Feb. 21, 2002

(65) Prior Publication Data

US 2004/0102329 A1    May 27, 2004

Related U.S. Application Data

(60) Provisional application No. 60/225,308, filed on Aug. 15, 2000.

(30) Foreign Application Priority Data

Aug. 14, 2000  (EP) ................... 00202854

(51) Int. Cl.
*H01B 12/00* (2006.01)
*H01F 6/00* (2006.01)
*H01L 39/00* (2006.01)

(52) U.S. Cl. ............... 505/231; 505/232; 428/930

(58) Field of Classification Search ........... 505/230, 505/231, 430, 431, 726, 886, 887, 232; 174/125.1; 428/930
See application file for complete search history.

(56) References Cited

U.S. PATENT DOCUMENTS

| | | | |
|---|---|---|---|
| 3,541,221 A * | 11/1970 | Moisson-Franckhauser et al. ................ 174/13 |
| 3,668,297 A * | 6/1972 | Buchhold et al. .......... 174/15.5 |
| 3,864,508 A | 2/1975 | Beck |
| 4,175,212 A * | 11/1979 | Artbauer ................ 174/128.1 |
| 5,741,377 A | 4/1998 | Goyal et al. |
| 5,932,523 A * | 8/1999 | Fujikami et al. ............ 505/231 |
| 6,034,588 A | 3/2000 | Ando et al. |
| 6,313,408 B1 * | 11/2001 | Fujikami et al. ......... 174/125.1 |
| 6,759,593 B2 * | 7/2004 | Spreafico ................ 174/125.1 |

FOREIGN PATENT DOCUMENTS

WO    WO 00/39813    7/2000

OTHER PUBLICATIONS

Willis et al.; "Single and Multi-Phase AC Losses in HTS Prototype Power Transmission Conductors"; IEEE Transactions on Applied Superconductivity, vol. 9, No. 2, pp. 778-781, (1999).

(Continued)

*Primary Examiner*—Colleen P. Cooke
(74) *Attorney, Agent, or Firm*—Finnegan, Henderson, Farabow, Garrett & Dunner, L.L.P.

(57) ABSTRACT

In order to reduce the AC losses in a superconducting conductor element subjected to an external magnetic field and through which a current flows, tapes of superconducting material of each layer are wound at such a mutual distance that the gap between the superconducting material of adjacent tapes is not smaller than a predetermined minimum value. These elements are particularly useful in three-phase warm dielectric superconducting cables.

17 Claims, 5 Drawing Sheets

OTHER PUBLICATIONS

Müller, "Self-Field Hysteresis Loss in Periodically Arranged Superconducting Strips"; Physica C, vol. 289, pp. 123-130, (1997).

Kelley et al.; "Applications of HTS Cables to Power Transmission: State-of-the-Art and Opportunities"; Proc. of IEEE Transactions on Power Delivery,Dist. Conference, New Orleans, pp. 13-19 (Apr. 1999).

* cited by examiner

SUPERCONDUCTING CABLE

CROSS REFERENCE TO RELATED APPLICATIONS

This application is a national phase application based on PCT/EP01/08950, filed Aug. 2, 2001, the content of which is incorporated herein by reference, and claims the priority of European Patent Application No. 00202854.6, filed Aug. 14, 2000, the content of which is incorporated herein by reference, and claims the benefit of U.S. Provisional Application No. 60/225,308, filed Aug. 15, 2000, the content of which is incorporated herein by reference.

BACKGROUND OF THE INVENTION

1. Field of the Invention

The present invention relates in general to superconducting cables, that is to say cables intended for transporting electric current in so-called superconductivity conditions, namely in conditions of almost zero electrical resistance in the regime of transportation of direct current.

More in particular, the invention relates to a method for reducing alternating current (AC) losses in a superconducting conductor element subjected to an external magnetic field and through which a current flows. Furthermore, the invention relates to a superconducting conductor element. Furthermore, the invention relates to a superconducting phase element. Furthermore, the invention relates to a warm dielectric superconducting cable.

In the following description and in the following claims, the expression "superconducting conductor element" is meant to indicate the electrically active portion of a superconducting cable, comprising a support and at least one layer of superconducting material, intended for transporting the phase electric current or, in the case of a three-phase current, each phase current.

The expression "superconducting phase element" is meant to indicate each component of a superconducting cable associated with the or each phase, comprising a superconducting conductor element and the respective electrical and thermal insulations.

The expression "warm dielectric" (WD) is meant to indicate a structure of coaxial layers of a superconducting phase element comprising, essentially, a tubular axial support and at least one layer comprising superconducting material (that is to say a superconducting conductor element), a cryostat and a dielectric, wherein a fluid, typically liquid nitrogen, flows within the support element for cooling the superconducting material below its critical temperature.

The expression "superconducting material" is meant to indicate a material, as for example special niobium-titanium alloys, or ceramics based on mixed oxides of copper, barium and yttrium (YBCO) or of gadolinium, samarium or other rare earth (REBCO), or of bismuth, lead, strontium, calcium, copper, thallium and mercury (BSCCO), one of which phases has, below a certain temperature defined as critical temperature ($T_C$), an almost zero resistivity, in the regime of transportation of direct current.

The superconducting material is commonly used in the form of tapes wound around a substantially tubular support element. Tapes containing a film of superconducting material (YBCO or REBCO) supported by a steel tape, optionally coated with one or more layers of oxide, and tapes wherein filaments of superconducting material (BSCCO) are embedded in a metallic matrix are well-known. The present description and the attached claims refer to both types of tape with the expression "tapes comprising superconducting material".

The expression "transport current" is meant to indicate a current flowing in a tape comprising superconducting material, in a superconducting conductor element, in a superconducting phase element, or in a superconducting cable, according to the circumstances.

2. Description of the Related Art

In the field of superconducting cables, a particularly important problem is that of minimizing the AC losses.

The losses in a superconducting material are essentially of a hysteretic nature, due to the intrinsic dissipation of the superconducting material caused by the penetration of a magnetic field within the superconducting material itself.

The losses of a hysteretic nature are added to the losses due to eddy currents, that is to say ohmic losses of the currents which are induced, by variable magnetic fields, in the metallic areas of the superconducting cable in general.

A first magnetic field causing losses is that generated by the transport current itself. This magnetic field is commonly referred to as "self-field".

External magnetic fields of particular interest to practical applications of superconducting cables are those due to the presence of the other phases in a three-phase or polyphase cable.

The expression "polyphase cable" is meant to indicate a cable wherein the current of each phase, in a single phase or three-phase current system, is distributed among various superconducting phase elements.

Other external magnetic fields of particular applicative interest are due to the presence of a generator, an engine or a current limiter near to a superconducting cable.

In order to eliminate or substantially reduce the losses due to external magnetic fields, cold dielectric (CD) superconducting cables are well known. In each superconducting phase element, these kinds of superconducting cables have at least one return layer comprising superconducting material, coaxial to that intended for transporting the current, and shielding the latter from external magnetic fields. Such cables however have rather high initial costs due to the practically double quantity of superconducting material used compared to warm dielectric cables.

In warm dielectric superconducting cables, with which the present invention is especially concerned, however, the superconducting material for transporting the current is not shielded.

The effect of magnetic coupling between the phases of a three-phase warm dielectric superconducting cable on the losses in a superconducting conductor element through which a transport current flows has been studied in the paper of J. O. Willis et al., "Single and Multi-Phase ac Losses in HTS Prototype Power Transmission Conductors", IEEE TRANSACTIONS ON APPLIED SUPERCONDUCTIVITY, Volume 9, June 1999, page 778.

The results, indicated therein, of the measurements carried out indicate that the losses in three-phase configuration, that is to say the total losses in the presence of a transport current and of the magnetic field generated by the current of the other two phases, flowing in resistive conductors, are greater than the sum of the losses due to the sole transport current (single-phase configuration) and the losses due to the sole current in the conductors of the other phases (two-phase configuration), or, briefly, that the AC losses have a non-linear nature.

According to this paper, furthermore, the losses in the single-phase configuration decrease with increasing critical current of the superconducting conductor element.

The expression "critical current (density)" is meant to indicate the current (density) that generates at the ends of a superconducting conductor element an electric field equal to 1 mV/cm.

In the article by K. H. Müller, "Self-field hysteresis loss in periodically arranged superconducting tapes", Phisica C 289, pages 123–130, 1997, an analytical calculation of the magnetic field distribution, of the current distribution and of the self-field losses in two configurations of superconducting strips through which a transport current flows is presented.

The configurations studied are presented as an idealized model of the arrangement of tapes comprising superconducting material in superconducting conductor elements of superconducting cables.

More in particular, the z-stack configuration is studied, i.e. an infinite series of strips placed with the wide faces adjacent and spaced out and the x-array configuration, i.e. an infinite series of strips placed with the narrow faces adjacent and spaced out.

Such a paper concludes that the self-field AC losses per strip decrease with decreasing gap between the strips and are minimal with a zero gap.

In this regard, the Applicant observes that a zero gap is an ideal condition, difficult to put into practice. In fact, for technological reasons, in the machine production of superconducting conductor elements it is exceedingly difficult to wind the superconducting tapes with continuity. Furthermore, in the case of metallic matrix/multifilament tapes, as described in further detail below in the present description, even by reducing to zero the distance between the tapes, a gap still remains (in the order of about 0.6 mm) between the superconducting material of adjacent tapes, due to the presence of an edge area of the metallic matrix which is free of superconducting filaments.

SUMMARY OF THE INVENTION

The Applicant has now found that an increase in the gap between the superconducting material of adjacent tapes has the effect of reducing the total AC losses in the presence of a transport current and of an external magnetic field, in particular due to the magnetic coupling between the phase elements in a three-phase warm dielectric superconducting cable.

Besides reducing losses, the spacing of the superconducting tapes according to the present invention has the further advantage of facilitating machine production of the superconducting phase element.

In a first aspect, the invention relates to a method for reducing the AC losses in a superconducting conductor element subjected to an external magnetic field and through which a current flows, comprising the steps of:
(a) providing a substantially tubular support element,
(b) arranging a plurality of tapes comprising superconducting material in at least one layer around the support element, wherein adjacent tapes of each layer are maintained at such a mutual distance that the gap between the superconducting material of adjacent tapes is not smaller than a predetermined minimum value.

In the practice of the present invention, the value of the gap between the superconducting material of adjacent tapes is chosen by taking into account the opposing requirements of maximizing it to reduce the AC losses and of minimizing it to increase the quantity of transport current, with the same geometry of the superconducting conductor element.

Preferably, the predetermined minimum value is 1.2 millimetres.

More preferably, the minimum value of the gap is 1.4 millimetres, even more preferably it is 2 millimetres.

In a second aspect, the invention relates to a superconducting conductor element, comprising at least one layer of tapes comprising superconducting material around a substantially tubular support element, the tapes of each layer being mutually spaced out, characterised in that the tapes of each layer are at such a mutual distance that the gap between the superconducting material of adjacent tapes is not smaller than 1.2 millimetres.

Preferably, the tapes comprising a superconducting material are arranged in a number of layers between 2 and 10.

Between adjacent tapes a layer of a material suitable for facilitating the sliding between the layers of tapes may be placed, for example carbon paper or TYVEK™.

The gap between the superconducting material of the different pairs of adjacent tapes may be constant.

Alternatively, the gap between the superconducting material of adjacent tapes may vary from one layer to another.

Preferably, the tapes comprising superconducting material of each layer are helically wound around the support element, at a respective predetermined winding angle—with respect to the longitudinal direction of the support element—preferably between 5° and 50°, more preferably between 8° and 40°. This measure allows for a reduction in any possible mechanical stress of the tapes themselves.

The gap in each layer may in this case be chosen, from the ranges of values specified above, in such a way as to minimize the difference in critical current between the various layers of tapes comprising superconducting material.

The tapes comprising superconducting material of at least two adjacent tapes are helically wound in opposite directions.

In a first embodiment, the tapes comprising superconducting material are of metallic matrix/multifilament type, as are obtained by the well-known "Powder-in-tube" process and as explained in more detail herebelow.

In this case, as filaments of superconducting material those defined above with the initials BSCCO can be conveniently used.

Preferably, the superconducting material is the mixed oxide called BSCCO-2223 or Bi-2223.

The metallic matrix is preferably made from silver, gold or suitable alloys thereof with other metals.

The tapes can be further partially or totally coated with a metal layer, preferably of steel or a copper-beryllium alloy.

In an alternative embodiment, the tapes comprise a superconducting material in the form of a film, for example those defined above with the initials YBCO or REBCO. These, for example, are prepared as described in U.S. Pat. No. 5,741, 377 to Martin Marietta Co.

In a third aspect, the invention relates to a warm dielectric superconducting phase element comprising a superconducting conductor element as described above, a cryostat coaxially external to it, and a dielectric coaxially external to the cryostat.

Preferably, the superconducting phase element of the invention is cooled down by means of a suitable pressurized or undercooled cooling fluid, in order to ensure the heat exchange necessary for its operation and to guarantee that a temperature suitably below the critical temperature of the superconducting material is maintained, even for a phase element of a long length.

During its flow, in fact, the cooling fluid is simultaneously subjected to progressive heating, as a result of the heat released as a consequence of the losses of the various components, and to a progressive loss in pressure, due to hydraulic losses while flowing through the phase element and to the more or less turbulent flow of the fluid itself.

Preferably, the superconducting material is of the so-called high temperature type ($T_C$ in the order of about 100K) and is cooled down to a temperature between about 63K and 90K.

Such cooling if preferably achieved using liquid nitrogen as the cooling fluid, at a working pressure between 5 and 25 bar.

Preferably, the cooling fluid is circulated within the substantially tubular support element.

In a fourth aspect, the invention relates to a warm dielectric superconducting cable comprising at least one superconducting phase element as described.

Preferably, said superconducting cable is a three-phase cable.

BRIEF DESCRIPTION OF THE DRAWINGS

Further features and advantages of the present invention will appear more clearly from the following detailed description of an embodiment thereof, given hereinbelow, with reference to the attached drawings. In the drawings.

DETAILED DESCRIPTION OF THE INVENTION

Figure 1:
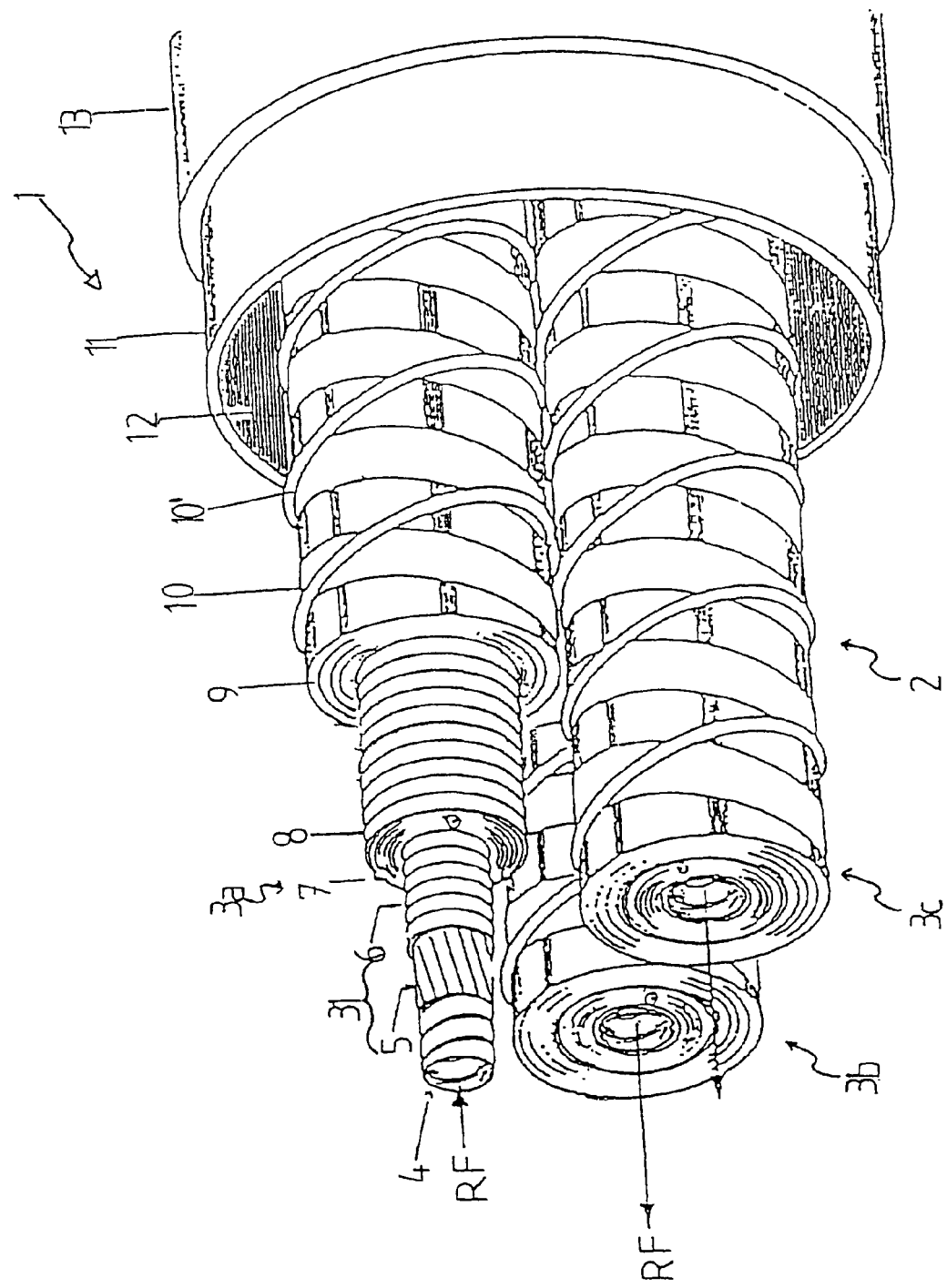
FIG. 1 shows a perspective view in partial cross-section of a three-phase warm dielectric superconducting cable, according to an embodiment of the present invention.

With reference to FIG. 1, a three-phase warm dielectric superconducting cable 1 according to the present invention comprises a superconducting core, globally indicated by 2, comprising a plurality of superconducting phase elements 3, indicated by 3a, 3b, 3c, housed, preferably loosely, within a tubular containing case 11, for example of a metallic material, such as steel, copper, aluminium or the like.

The tubular containing case 11 is preferably formed from a tape wound in tubular form and longitudinally welded, or from an extruded tube or similar. Whenever the demands for flexibility of the cable so require, this may be corrugated.

Each of the phase elements 3 comprises a superconducting conductor element 31 comprising a substantially tubular support element 4 and, coaxially upon it, at least one layer 5 comprising superconducting material (described in detail below).

Each of the phase elements 3 further comprises, coaxially external to the superconducting conductor element 31: a cryostat made up of a first corrugated tube 6, a thermal insulator 7 and a second corrugated tube 8; a dielectric 9; a metallic shield 10; and spacers 10'.

The cryostat 6–8, having the purpose of minimizing outward thermal dispersion, comprises a thermal insulator 7 formed, for example, by a plurality of superimposed layers, and at least one protection sheath.

A cryostat, well known in the art, is described for example in an article by N. Kelly et al., Proc. Of IEEE TRANSACTIONS ON POWER DELIVERY, Dist. Conference, New Orleans, April 1999.

More in particular, the thermal insulator 7 is, for example, made up of several surface-metallized tapes (for example some tens) made from a polyester resin, known in the field as "thermal super-insulator", loosely wound, possibly with the aid of interposed spacers (not shown).

Furthermore, cable 1 comprises a cooling circuit for circulating a cooling fluid suitable for cooling the superconducting material to a temperature suitably below its critical temperature. In the cable of FIG. 1, such superconducting material is preferably of high temperature type, that is to say having a critical temperature $T_C$ in the order of about 110K.

The above-mentioned cooling circuit comprises suitable pumping means, well-known per se and therefore not shown, intended for supplying a suitable cooling fluid, for example liquid nitrogen, at a temperature typically between 65 and 90K, within the substantially tubular support elements 4 of each of the superconducting conductor elements 31, as indicated by arrows RF.

In the case that the dielectric 9 is of impregnated type, the tubular containing case 11 may be filled with gas or oil 12 at a pressure, for example, of 13.8 bars, in order to lubricate and increase the performance of dielectric 9.

The tubular containing case 11 is furthermore preferably coated with an external sheath 13, for example made of polyethylene.

Figure 2:
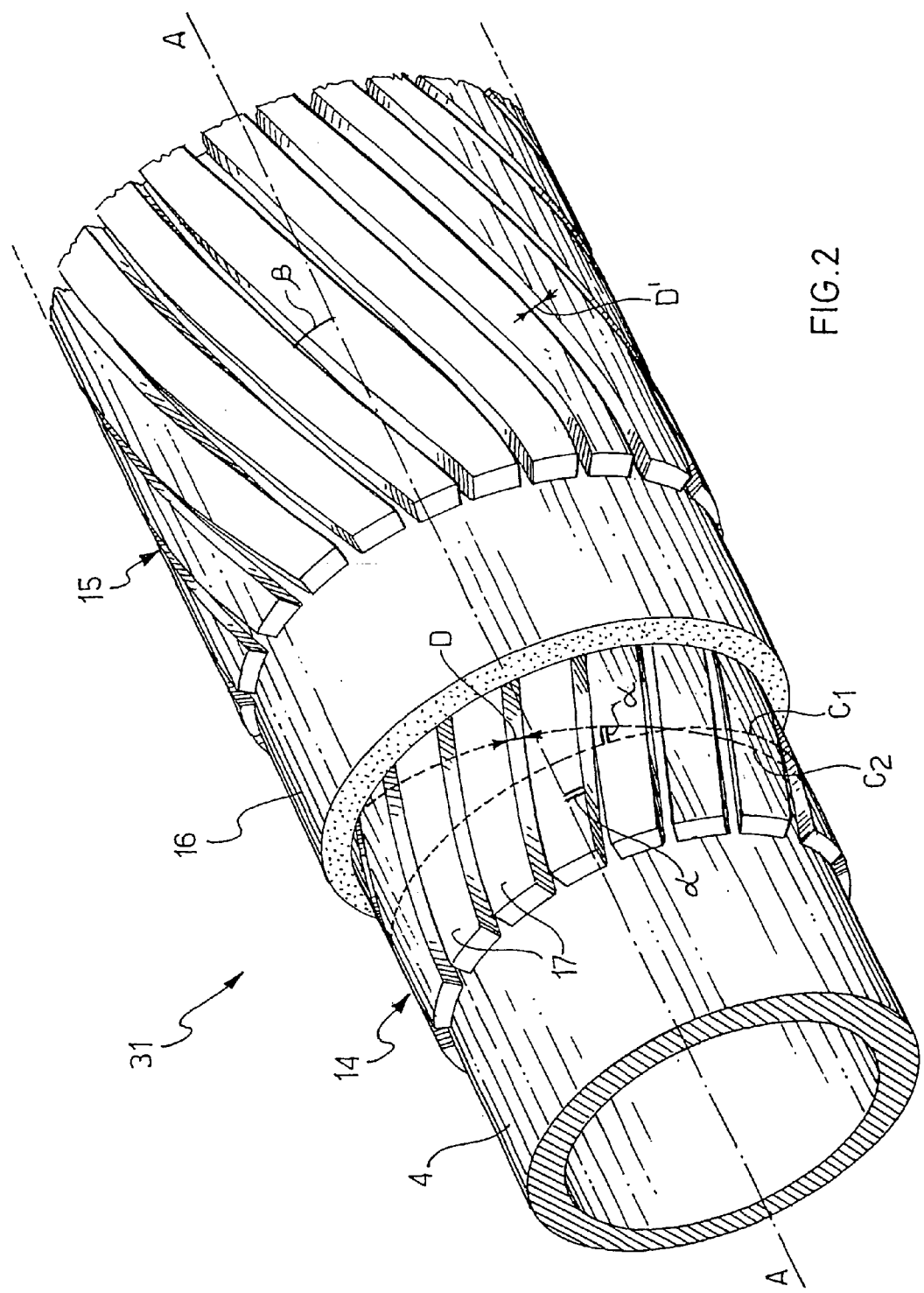
FIG. 2 shows a perspective view, on an enlarged scale and in partial cross-section, of a superconducting conductor element of the cable of FIG. 1.

FIG. 2 shows the superconducting conductor element 31, in perspective and not to scale, wherein the support element 4 is schematized.

Layers 14 and 15, just like any other superconducting layer that may be present, are preferably separated by a layer 16 of a material suitable for promoting the sliding between the layers, for example carbon paper or TYVEK™.

Each superconducting layer 14, 15 is in turn made up of a plurality of tapes 17 helically wound according to a respective winding angle α, β. The winding angles of each superconducting layer may vary as described above.

The winding directions and angles of the tapes 17 of the various layers may be equal or different, but preferably at least two adjacent layers are provided comprising tapes wound in opposite directions, as superconducting layers 14, 15 shown in FIG. 2.

The tapes 17 of a same superconducting layer are reciprocally spaced out. This distance has been indicated by D for the tapes 17 of superconducting layer 14 and by D' for the tapes 17 of superconducting layer 15.

In order to be unaffected by the winding angle of the tapes 17, the distance D (and D') is indicated in the cross direction of the tapes themselves, i.e. on the circumference $C_2$ illustrated, which forms together with the circumference $C_1$ illustrated, perpendicular to the axis A—A of the phase element, an angle α equal to the winding angle of the tapes 17.

The distance between adjacent tapes may be constant or vary from one layer to the other.

Figure 3:
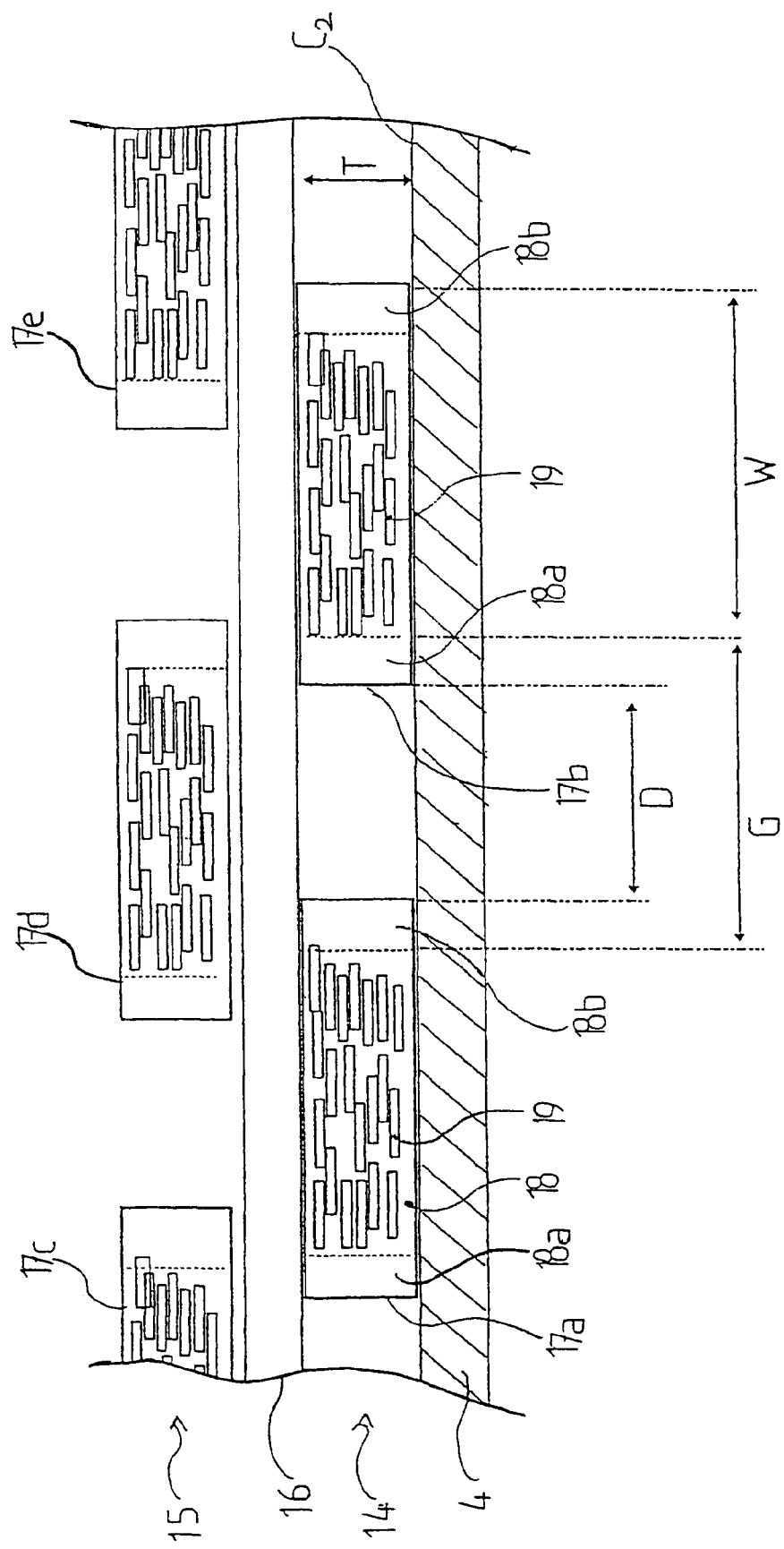
FIG. 3 shows, on an even more enlarged scale, a diagrammatic partial cross-section through the superconducting conductor element of FIG. 2.

FIG. 3 shows a diagrammatic cross-section of the superconducting conductor element 31, taken along a portion of circumference $C_2$ in FIG. 2. The portion of circumference is illustrated as rectilinear in virtue of the high ratio between the transverse size (width W) of each tape 17a–17e and the radius of curvature of the support element 4. In FIG. 3, thickness T of the tapes is also indicated.

Preferably, the thickness T is much less than the width W, that is to say that the tapes 17 comprising superconducting material have a high aspect ratio.

The width of the tapes 17 of each layer 14, 15 may, furthermore, be the same or different.

The tapes 17a–17b of the embodiment shown in FIG. 3 are of metallic matrix/multifilament type, obtained by the process known as "Powder-in-Tube" (PIT). This process essentially involves pressing a powder precursor of the superconducting material, for example the above-mentioned BSCCO material, in a tube made of silver, silver alloy or other noble metal. The tube is subsequently deformed by drawing or rolling and thermally treated to convert the powder precursor into the superconducting material.

The resulting section, which can be seen from FIG. 3, appears as substantially rectangular and comprises a metallic "matrix" 18, in the internal portion whereof the superconducting material 19 is concentrated in the form of a plurality of filaments of a substantially rectangular cross-section and distributed in a substantially irregular manner.

Tapes made in this way, in which the superconducting material is the above-mentioned BSCCO material and the metallic matrix is of silver or alloys thereof, are well-known in the art as BSCCO/Ag tapes.

As can be appreciated, in side areas of the tapes 17 two edges 18a, 18b are formed of a metallic matrix substantially free of superconducting filaments 19.

The superconducting material 19 of two adjacent tapes 17, for example of the tapes 17a, 17b shown, are therefore spaced out by a gap indicated by G, greater than the above-mentioned distance D.

The tapes 17 may, furthermore, be partially or totally coated with a metallic layer (not shown), for example of steel or a copper-beryllium alloy.

Similar considerations apply for a superconducting material of YBCO or REBCO type, as defined above.

With reference to what has been described hereinabove, some examples will be provided below, by way of non-limitative indication, suitable to illustrate the behaviour of the AC losses in an embodiment of a superconducting conductor element according to the invention and of a superconducting conductor element according to the prior art.

EXAMPLE 1

According to an embodiment of the invention, a prototype of a superconducting conductor element was made.

The superconducting conductor element comprised a tubular support having a diameter of 30.2 millimetres, upon which 63 BSCCO-2223/Ag tapes, supplied by the American Superconductor Corporation, Westborough, Mass., U.S.A., were wound by hand in four layers.

More in particular, there were 15, 17, 17 and 14 tapes, helically wound at winding angles of −29.5°, −13°, 13° and 38°, respectively from the innermost layer to the outermost layer.

The tapes used, of the type marketed as "Wide", had a width of 4.1±0.1 mm and a silver matrix thickness of 0.215 mm, and were coated on the main faces with a steel sheet, to a total thickness of 0.32 mm.

The distance between adjacent tapes of each layer, measured as defined above, was of 1.4 mm. Such a distance, considering the transverse size of the metallic edges of the silver matrix, corresponded to a gap between the superconducting material of adjacent tapes, as defined above, of 2 millimetres.

The average value of the critical current per tape, as measured on each tape, was of 95.5 A. The total critical current calculated as the product between the number of tapes and the critical current per tape was of about 6000 A. The total critical current measured turned out to be 4750±100 A, with a degradation with respect to the calculated value ($\Delta I_c/I_c$) of −21%.

The current distribution resulted to be uniform among the layers.

AC losses measurements have been carried out using a temperature-difference calorimeter in the manner described in the above-cited paper by J. O. Willis et al, to which reference is made for all details.

Loss measurements in three-phase configuration have been carried out as described in the above-mentioned publication. In particular, the current was caused to flow in the phase comprised of the superconducting conductor element and also in two other phases comprised of normal (resistive) conductor elements.

Figure 4:
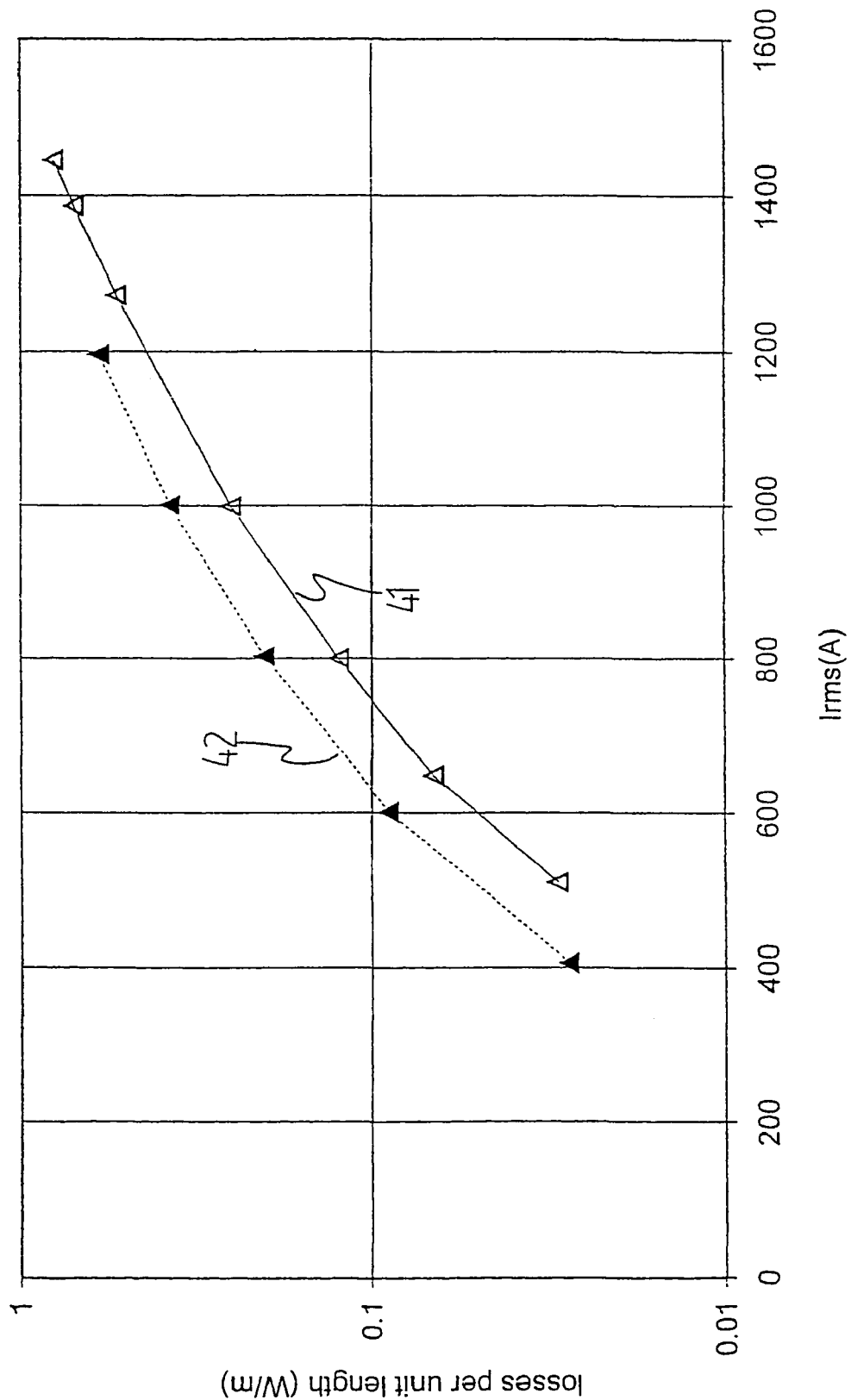
FIGS. 4 and 5 show the results of experimental measurements.
Figure 5:
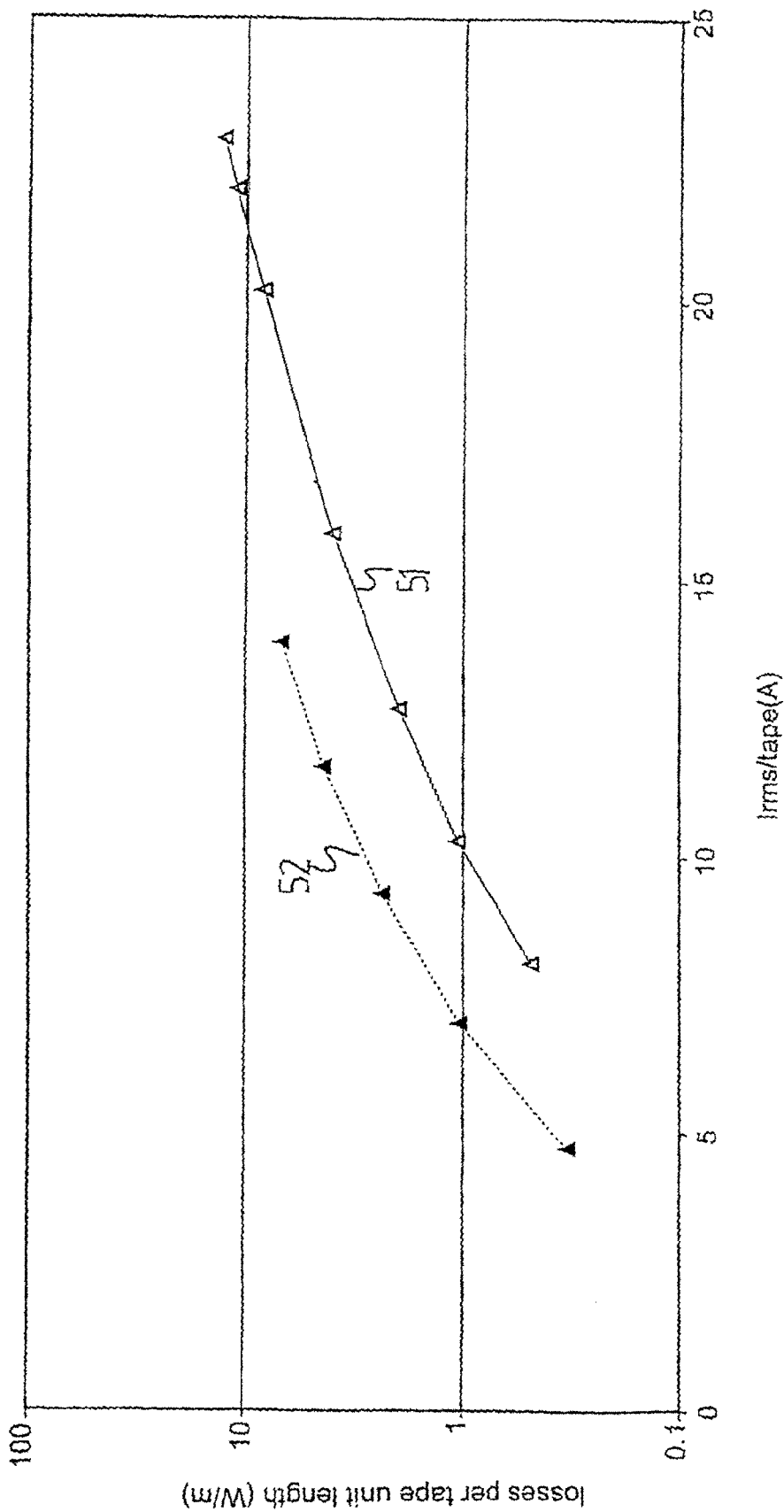

FIGS. 4 and 5 graphically show the measurement results. FIG. 4 shows the patterns of the total losses within the superconducting conductor element as a function of the root-mean-square value of the transport current in the superconducting conductor element, while FIG. 5 shows the patterns of the losses per unit length of the tape comprising superconducting material as a function of the root-mean-square value of the transport current per tape.

More in particular, lines 41 and 51 illustrate the measured values and the approximate curves of the losses in three-phase configuration, at a temperature of 76K and a frequency of 60 Hz.

EXAMPLE 2—COMPARISON

With the purpose of comparing the AC losses, a superconducting conductor element was made, comprising a tubular support with a diameter of 30.2 mm, upon which 86 BSCCO-2223/Ag tapes, supplied by the American Superconductor Corporation, Westborough, Mass., U.S.A., were wound, by hand and in four layers. There were 20, 23, 23 and 20 tapes, helically wound at winding angles equal to those of the Example 1.

The distance between adjacent tapes of each layer, measured perpendicularly to the longitudinal dimension of the tapes, was of 0.1 mm. Such a distance, considering the transverse size of the metallic edge of the silver matrix, corresponded to a gap, as defined above, of 0.7 mm.

The tapes used had a width of 4.0±0.1 mm and a silver matrix thickness of 0.205 mm and were coated on the main faces with a steel sheet, to a total thickness of 0.32 mm.

The average value of the critical current per tape, as extrapolated from sample measurements, was of 76.5 A. The calculated total critical current was of about 6600 A. The measured total critical current turned out to be 5400±500 A, with a degradation with respect to the calculated value of −18%.

The current distribution turned out to be uniform among the layers.

Also for this superconducting conductor element, AC loss measurements were carried out using the temperature-difference calorimeter in three-phase configuration as described in Example 1.

In FIGS. 4 and 5, lines 42 and 52 illustrate the measured values and the approximate curves of the losses in three-phase configuration, at a temperature of 76K and a frequency of 60 Hz.

Table I below summarizes the parameters of the two prototypes of Examples 1 and 2.

TABLE I

| PARAMETER | Example 1 (Invention) | Example 2 (Comparison) |
|---|---|---|
| Diameter of support element (mm) | 30.2 | 30.2 |
| Winding angles | −29.5°/−13°/13°/38° | −29.5°/−13°/13°/38° |
| Number of layers | 4 | 4 |
| Measured total $I_C$ (A) | 4750 ± 100 | 5400 ± 500 |
| $\Delta I_C/I_C$ | −21% | −18% |
| Tape width (mm)/thickness (mm) | 4.1/0.32 | 4.0/0.32 |
| Number of tapes: total and per layer | 63 15/17/17/14 | 86 20/23/23/20 |
| Average $I_C$ per tape (A) | 95.5 | 76.5 |
| Calculated total $I_C$ (A) | 6000 | 6600 |
| Distance between tapes (mm) | 1.4 | 0.1 |
| Gap (mm) | 2 | 0.7 |

Taking into account that the parameters considered to be essential in order to evaluate the AC losses are the following: diameter of the support element, winding angles of the layers, measured total critical current and thickness of the layers, it can be seen that the superconducting conductor elements of Table I exhibited characteristics that, to the above mentioned purposes, are substantially similar.

They differed remarkably in the distance between the tapes and, therefore, in the gap between the superconducting material of adjacent tapes. Furthermore they also differed, to a lower degree, in the values of critical current. In particular, even though the critical current per tape of the element according to the invention is slightly higher, its total critical current, both measured and calculated, was slightly lower.

From an analysis of the plots of FIGS. 4 and 5 it can be appreciated that the losses in three-phase configuration of the element of Example 1, with a greater gap, turned out to be notably lower than those of the element of Example 2, with a smaller gap.

The small difference in the total critical current does not account for this behaviour of the losses, as it could at the most have the effect of increasing the losses in the sample of Example 1 with respect to those of the sample of Example 2. It is in fact well known that the AC loss component due to self-field decreases with increasing total critical current—see, for example, the cited paper by J. O. Willis et al., which also indicates that the losses in three-phase configuration depend only slightly on the total critical current.

This behaviour of the AC losses in three-phase configuration is therefore to be ascribed to the change in the gap, the losses turning out to be inversely related to it, in contrast with what suggested by the theory developed in the cited article by K. H. Muller.

By virtue of the remarkably superior performance of the superconducting conductor element with a greater gap (Example 1) in three-phase configuration, such a superconducting conductor element according to the invention may advantageously be used in various configurations of a superconducting cable.

In fact, the measuring conditions in three-phase configuration followed in the Examples can be compared not only to the working conditions of each superconducting phase element in a three-phase cable, but also to the working conditions in a single-phase cable subjected to external magnetic fields, such as for example a single-phase cable placed near to a generator, an engine, a current limiter etc.

What is claimed is:

1. A method for reducing AC losses in a superconducting conductor element subjected to an external magnetic field and through which a current flows, comprising the steps of:
   (a) providing a substantially tubular support element; and
   (b) arranging a plurality of tapes comprising superconducting material in at least one layer around the support element, wherein the tapes of each layer are maintained at such a mutual distance that the gap between superconducting material of adjacent tapes is not smaller than a predetermined minimum value,
   wherein the predetermined minimum value is 1.2 millimeters.

2. The method according to claim 1, wherein the predetermined minimum value is 1.4 millimeters.

3. The method according to claim 1, wherein the predetermined minimum value is 2 millimeters.

4. The method according to claim 1, wherein the tapes comprising superconducting material are arranged in a number of layers between 2 and 10.

5. The method according to claim 4, wherein step (b) of arranging the tapes is carried out by helically winding the tapes of each layer around the support element, the tapes of at least two adjacent layers being wound in opposite directions.

6. The method according to claim 1, wherein the tapes comprising superconducting material are of metallic matrix/multifilament type.

7. The method according to claim 6, wherein the superconducting material is of BSCCO type.

8. A superconducting conductor element comprising at least one layer of tapes comprising superconducting material arranged around a substantially tubular support element, the tapes of each layer being mutually spaced out, and having such a mutual distance that the gap between the superconducting material of adjacent tapes is not smaller than 1.2 millimeters.

9. The superconducting conductor element according to claim 8, wherein the gap has a predetermined minimum value of 1.4 millimeters.

10. The superconducting conductor element according to claim 8, wherein the gap has a predetermined minimum value of 2 millimeters.

11. The superconducting conductor element according to claim 8, comprising 2 to 10 layers of tapes comprising superconducting material.

12. The superconducting conductor element according to claim 11, wherein the tapes of each layer are helically wound around the support element, the tapes of at least two adjacent layers being wound in opposite directions.

13. The superconducting conductor element according to claim 8, wherein the tapes comprising superconducting material are of metallic matrix/multifilament type.

14. The superconducting conductor element according to claim 13, wherein the superconducting material is of BSCCO type.

15. A warm dielectric superconducting phase element comprising a superconducting conductor element according to claim 8.

16. A warm dielectric superconducting cable comprising at least one superconducting phase element according to claim 15.

17. The warm dielectric superconducting cable according to claim 16 comprising three phases.

* * * * *

UNITED STATES PATENT AND TRADEMARK OFFICE
CERTIFICATE OF CORRECTION

PATENT NO. : 6,985,761 B2  
APPLICATION NO. : 10/344455  
DATED : January 10, 2006  
INVENTOR(S) : Renata Mele It is certified that error appears in the above-identified patent and that said Letters Patent is hereby corrected as shown below:

Claim 1, column 10, line 12, "is 1.2" should read --is at least 1.2--.

Signed and Sealed this

Eighth Day of August, 2006

JON W. DUDAS  
*Director of the United States Patent and Trademark Office*